(12) United States Patent
Sullivan et al.

(10) Patent No.: US 9,382,840 B2
(45) Date of Patent: Jul. 5, 2016

(54) ENGINE CRANKSHAFT TORQUE SENSOR

(71) Applicant: Teledyne Instruments, Inc., Thousand Oaks, CA (US)

(72) Inventors: R. Michael Sullivan, Westport Point, MA (US); Roger W. Masson, Acushnet, MA (US); Jason J. Haglund, Middleboro, MA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 369 days.

(21) Appl. No.: 13/793,575

(22) Filed: Mar. 11, 2013

(65) Prior Publication Data

US 2014/0251265 A1 Sep. 11, 2014

(51) Int. Cl.
*F02B 77/08* (2006.01)
*G01L 5/00* (2006.01)
*F16C 3/08* (2006.01)
*F16C 3/14* (2006.01)

(52) U.S. Cl.
CPC . *F02B 77/08* (2013.01); *F16C 3/08* (2013.01); *F16C 3/14* (2013.01); *G01L 5/0009* (2013.01); *F02D 2200/1002* (2013.01)

(58) Field of Classification Search
CPC ........... G01L 3/00; G01L 3/101; G01L 3/102; G01L 3/108; G01L 3/1457; G01L 5/0009; F02B 77/08; F16C 3/08; F16C 3/14; F02D 2200/1002
USPC .................... 123/319, 197.1; 73/847, 862.08, 73/862.23, 862.331–862.338
See application file for complete search history.

(56) References Cited

U.S. PATENT DOCUMENTS

| 4,135,390 | A |   | 1/1979 | Templin |
|---|---|---|---|---|
| 4,589,290 | A | * | 5/1986 | Sugiyama et al. ....... 73/862.333 |
| 5,269,178 | A |   | 12/1993 | Vigmostad et al. |
| 6,260,421 | B1 |   | 7/2001 | Torbjornsoon et al. |
| 6,269,702 | B1 | * | 8/2001 | Lambson ................. 73/862.045 |
| 6,758,105 | B2 |   | 7/2004 | Viola et al. |
| 6,846,260 | B2 |   | 1/2005 | Horiuchi |
| 6,895,828 | B2 |   | 5/2005 | Nakatani et al. |
| 7,201,044 | B1 |   | 4/2007 | Bunyer et al. |
| 7,389,682 | B2 |   | 6/2008 | Javaherian |
| 7,493,831 | B2 |   | 2/2009 | Varonis |

(Continued)

FOREIGN PATENT DOCUMENTS

| EP | 1133682 | B1 |   | 3/2004 |
|---|---|---|---|---|
| EP | 1259788 | B1 |   | 8/2011 |
| JP | 2012149939 | A | * | 8/2012 |

OTHER PUBLICATIONS

English translation of JP 2012149939 A to Saito et al.*

*Primary Examiner* — Stephen K Cronin
*Assistant Examiner* — Xiao Mo
(74) *Attorney, Agent, or Firm* — K&L Gates LLP

(57) ABSTRACT

In various embodiments, an engine crankshaft is disclosed. The engine crankshaft comprises a rear bearing journal. The rear bearing journal has an output end. The rear bearing journal defines a substantially cylindrical cavity extending from the output end into the rear bearing journal. The engine crankshaft may further comprise at least one torque sensor operatively coupled to the rear bearing journal. The at least one torque sensor is configured to generate a torque signal corresponding to a torque exerted on the rear bearing journal. The torque exerted on the rear bearing journal is indicative of a torque output of an engine.

23 Claims, 11 Drawing Sheets

(56) References Cited

U.S. PATENT DOCUMENTS

| | | |
|---|---|---|
| 7,770,471 B2 | 8/2010 | Lohr et al. |
| 7,886,863 B2 | 2/2011 | Marsh et al. |
| 7,946,181 B2 * | 5/2011 | Kim et al. ................. 73/812 |
| 8,132,314 B2 | 3/2012 | Kashyap |
| 8,166,951 B2 | 5/2012 | Takahashi et al. |
| 2002/0011099 A1 | 1/2002 | Domens et al. |
| 2012/0297895 A1 | 11/2012 | Kapas et al. |

* cited by examiner

ENGINE CRANKSHAFT TORQUE SENSOR

BACKGROUND

Engine torque measurement is an important parameter used in the development of modern vehicle powertrains. In particular, much transmission development is conducted in test vehicles as opposed to on dynamometers. For this reason, it is advantageous to measure the torque output from an engine without requiring changes to the powertrain which may not easily be accommodated within an actual vehicle. A number of experimental means have been developed to measure engine output torque, such as modifying the flex plate or flywheel coupling that connects the engine to the transmission. Current methods are expensive and require significant design effort to isolate the torsional forces and fit the requisite components into the existing space constraints. Flex plate and flywheel solutions must also contend with high g-forces, vibration, and high temperatures.

Another solution employed is to rely on the calculated engine output torque data available from an engine controller. The torque signal or algorithm from the engine controller is a function of the throttle position, engine revolutions-per-minute (RPM), ignition advance, fuel flow, and a several other measurements. The torque algorithm is developed from dynamometer and vehicle testing where the actual torque is measured using torque sensors. These initial measurements are not always available or finalized at the early stages of engine and transmission development.

What is needed is a system and method for measuring engine torque during the development process without the need to modify the flex plate or flywheel and which do not rely on algorithmic calculations.

SUMMARY

In various embodiments, an engine crankshaft is disclosed. The engine crankshaft comprises a rear bearing journal. The rear bearing journal has an output end. The rear bearing journal defines a substantially cylindrical cavity extending from the output end into the rear bearing journal. The engine crankshaft may further comprise at least one torque sensor operatively coupled to the rear bearing journal. The at least one torque sensor is configured to generate a torque signal corresponding to a torque exerted on the rear bearing journal. The torque exerted on the rear bearing journal is indicative of a torque output of an engine.

In various embodiments, an internal combustion engine is disclosed. The internal combustion engine comprises an engine block, a plurality of pistons, and a crankshaft operably coupled to the plurality of pistons. The crankshaft comprises a rear bearing journal and at least one torque sensor. The rear bearing journal comprises an output end. The rear bearing journal defines a substantially cylindrical cavity extending from the output end into the rear bearing journal. The at least one torque sensor is operatively coupled to the rear bearing journal. The at least one torque sensor is configured to generate a torque signal corresponding to a torque exerted on the rear bearing journal by the engine.

In various embodiments, a method for measuring torque output of an engine is disclosed. The method comprises installing a torque sensing crankshaft into the engine. The torque sensing crankshaft comprises a rear bearing journal and at least one torque sensor. The rear bearing journal comprises an output end and defines a substantially cylindrical cavity extending from the output end into the rear bearing journal. The at least one torque sensor is operatively coupled to the rear bearing journal and is configured to generate a torque signal corresponding to a torque exerted on the rear bearing journal by the engine. The method further comprises operating the engine to generate torque and obtaining the torque signal from the at least one torque sensor.

DRAWINGS

The features of the various embodiments are set forth with particularity in the appended claims. The various embodiments, however, both as to organization and methods of operation, together with advantages thereof, may best be understood by reference to the following description, taken in conjunction with the accompanying drawings as follows:

DESCRIPTION

In various embodiments, an engine crankshaft is disclosed. The engine crankshaft comprises a rear bearing journal. The rear bearing journal has an output end. The rear bearing journal defines a substantially cylindrical cavity extending from the output end into the rear bearing journal. The engine crankshaft may further comprise at least one torque sensor operatively coupled to the rear bearing journal. The at least one torque sensor is configured to generate a torque signal corresponding to a torque exerted on the rear bearing journal. The torque exerted on the rear bearing journal is indicative of a torque output of an engine.

In various embodiments, an internal combustion engine is disclosed. The internal combustion engine comprises an engine block, a plurality of pistons, and a crankshaft operably coupled to the plurality of pistons. The crankshaft comprises a rear bearing journal and at least one torque sensor. The rear bearing journal comprises an output end. The rear bearing journal defines a substantially cylindrical cavity extending from the output end into the rear bearing journal. The at least one torque sensor is operatively coupled to the rear bearing journal. The at least one torque sensor is configured to generate a torque signal corresponding to a torque exerted on the rear bearing journal by the engine.

In various embodiments, a method for measuring torque output of an engine is disclosed. The method comprises installing a torque sensing crankshaft into the engine. The torque sensing crankshaft comprises a rear bearing journal and at least one torque sensor. The rear bearing journal comprises an output end and defines a substantially cylindrical cavity extending from the output end into the rear bearing journal. The at least one torque sensor is operatively coupled to the rear bearing journal and is configured to generate a torque signal corresponding to a torque exerted on the rear bearing journal by the engine. The method further comprises operating the engine to generate torque and obtaining the torque signal from the at least one torque sensor.

Reference will now be made in detail to several embodiments, including embodiments showing example implementations of engine crankshaft torque sensor systems. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

Figure 1A:
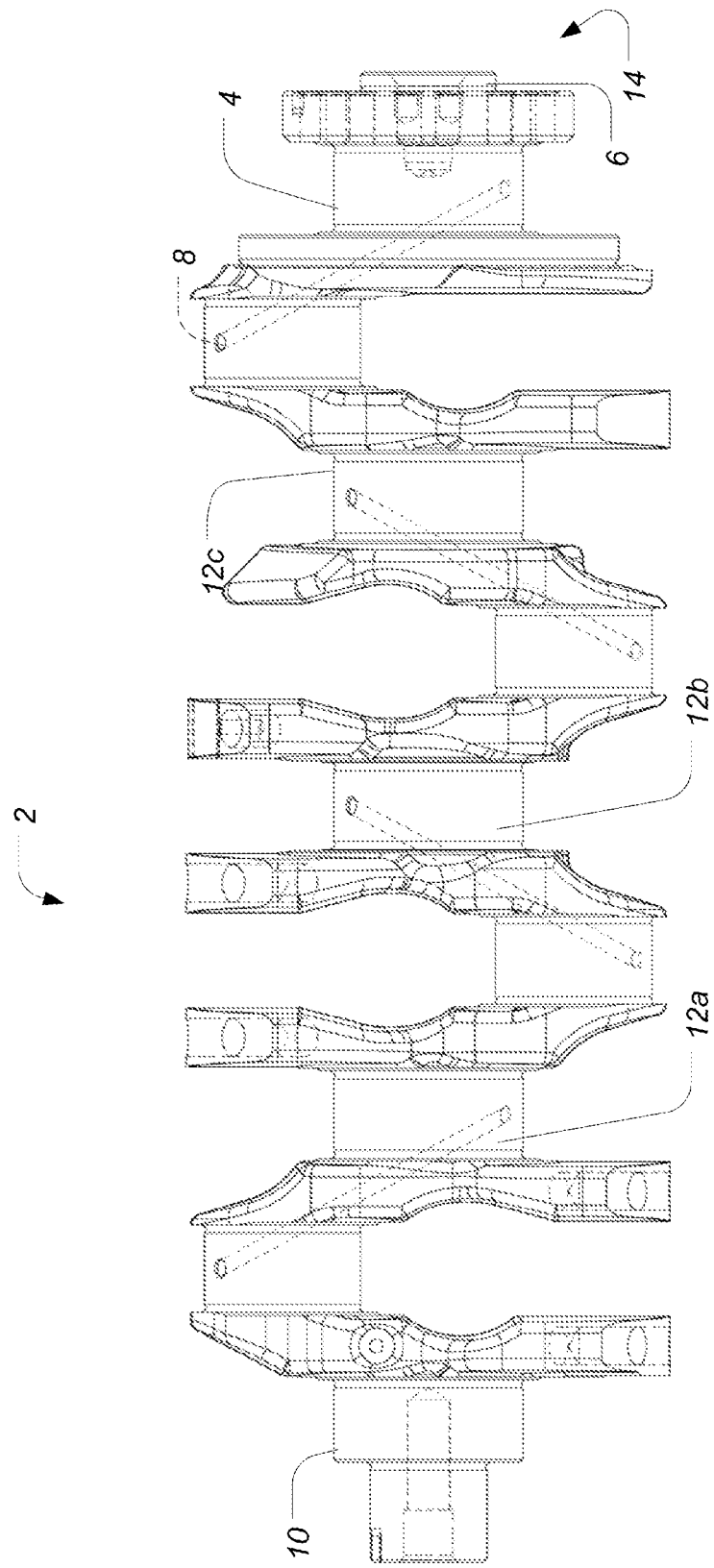
FIGS. 1A-1D illustrate one embodiment of a crankshaft configured for a four-cylinder engine.
Figure 1B:
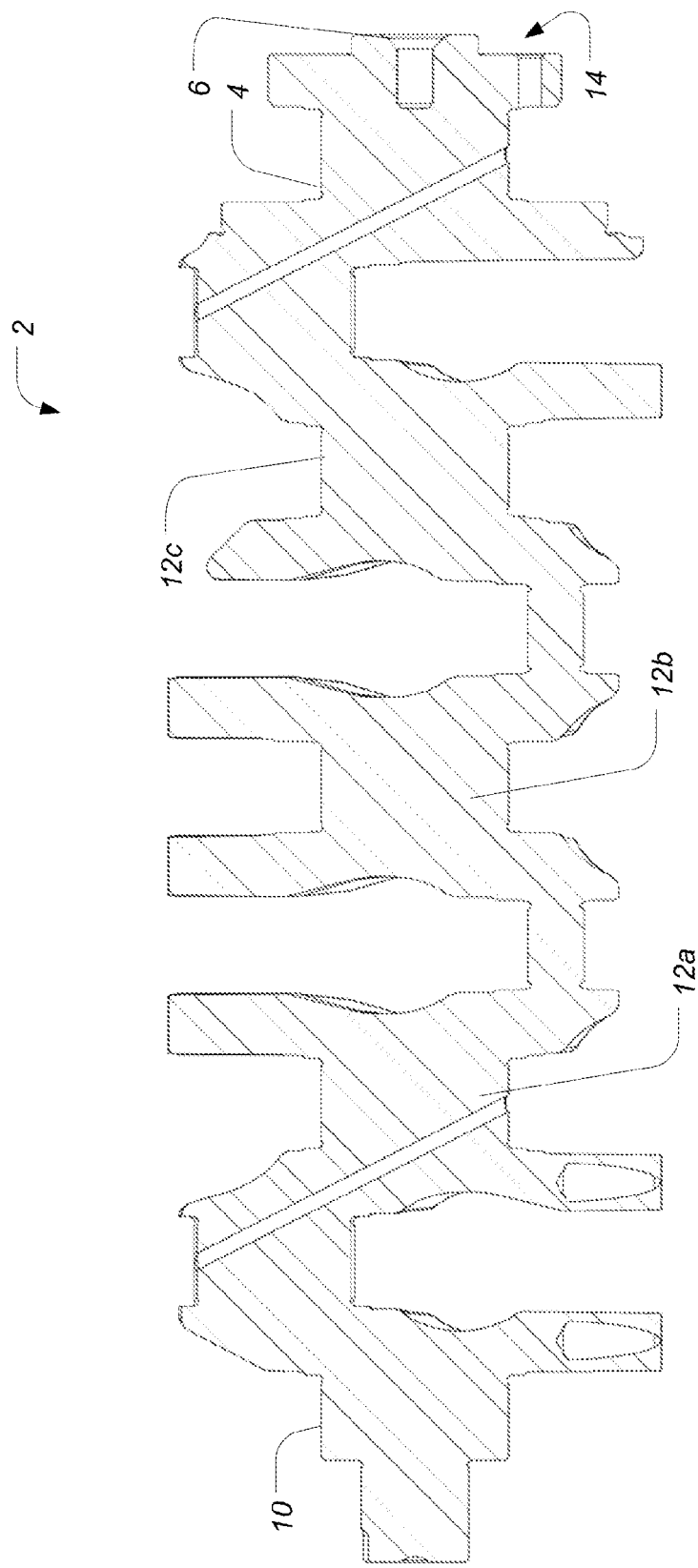
Figure 1C:
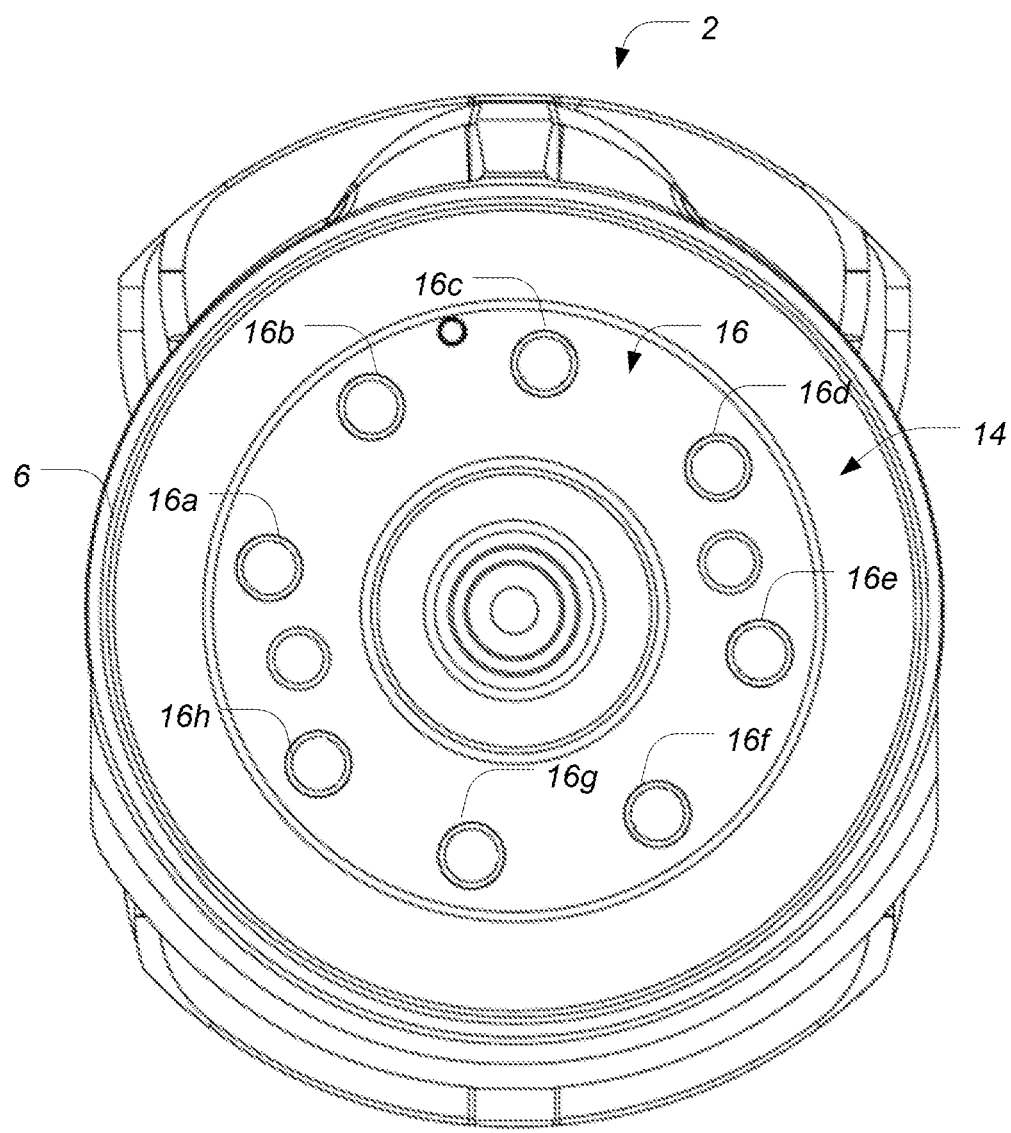
Figure 1D:
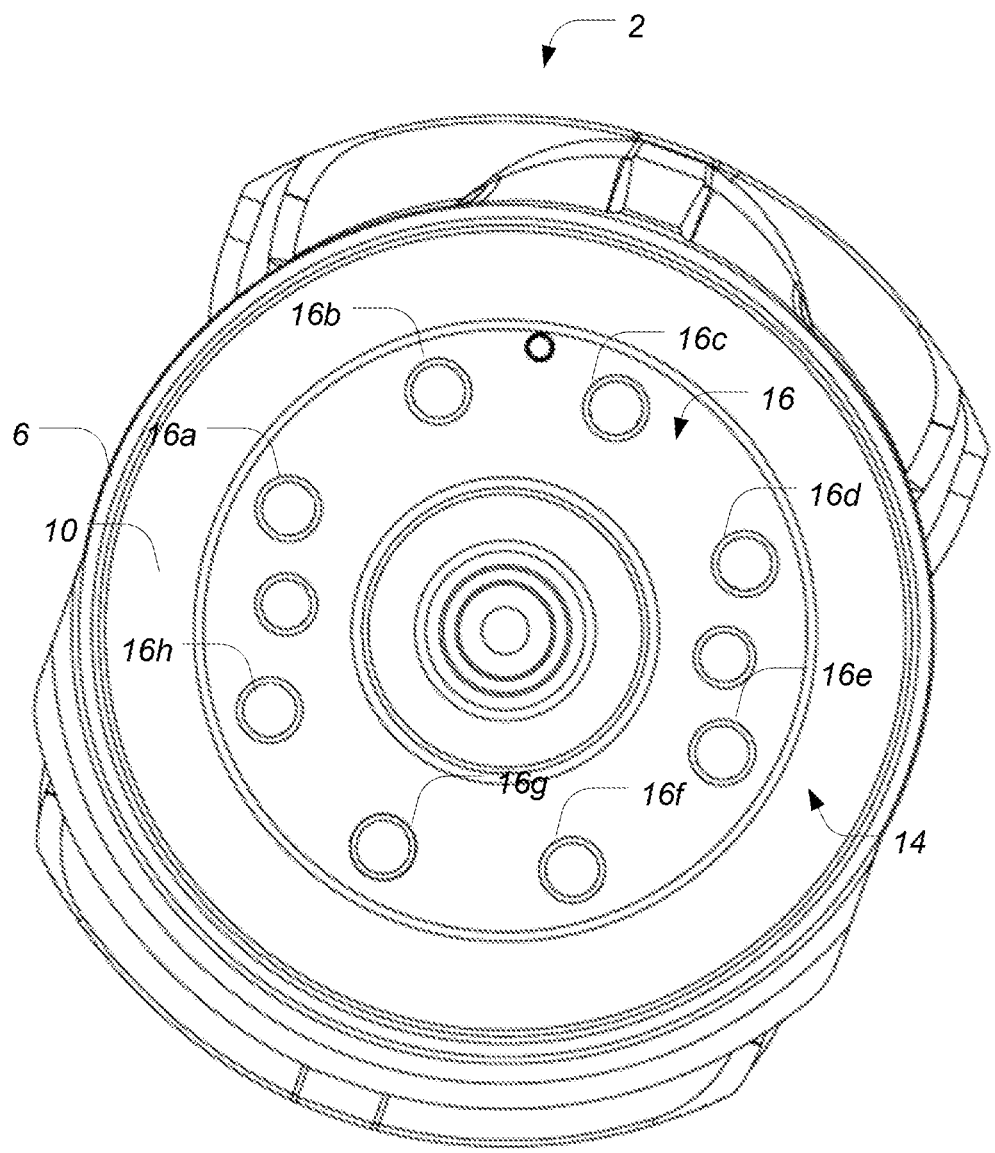

FIGS. 1A-1D illustrate one embodiment of an engine crankshaft 2. The engine crankshaft 2 is configured to couple to a four-cylinder engine (not shown). The engine crankshaft comprises a front bearing journal 10, a plurality of main bearing journals 12a-12c, and a rear bearing journal 4. The rear bearing journal 4 comprises a mounting plate 6 configured to couple an engine transmission component, such as, for example, a flywheel, a clutch, or a torque convertor, to the crankshaft 2. FIG. 1B illustrates a cross-sectional view of the engine crankshaft 2. The rear bearing journal 4 comprises an oil passage 8 for providing oil to and from the bearing journal 4. FIGS. 1C and 1D show one embodiment of an output end 14 of the crankshaft 2. The output end 14 may comprise a mounting plate 6. The mounting plate 6 may comprise a bolt circle 16. The bolt circle 16 may comprise a plurality of bolt passages 16a-16f. The plurality of bolt passages 16a-16f are configured to receive bolts therethrough when the crankshaft 2 is mounted to a transmission component, such as, for example, a flywheel. FIG. 1D shows the crankshaft 2 in a rotated position, illustrating that the crankshaft 2, mounting plate 6, and a transmission component attached thereto rotate in unison.

Figure 2:
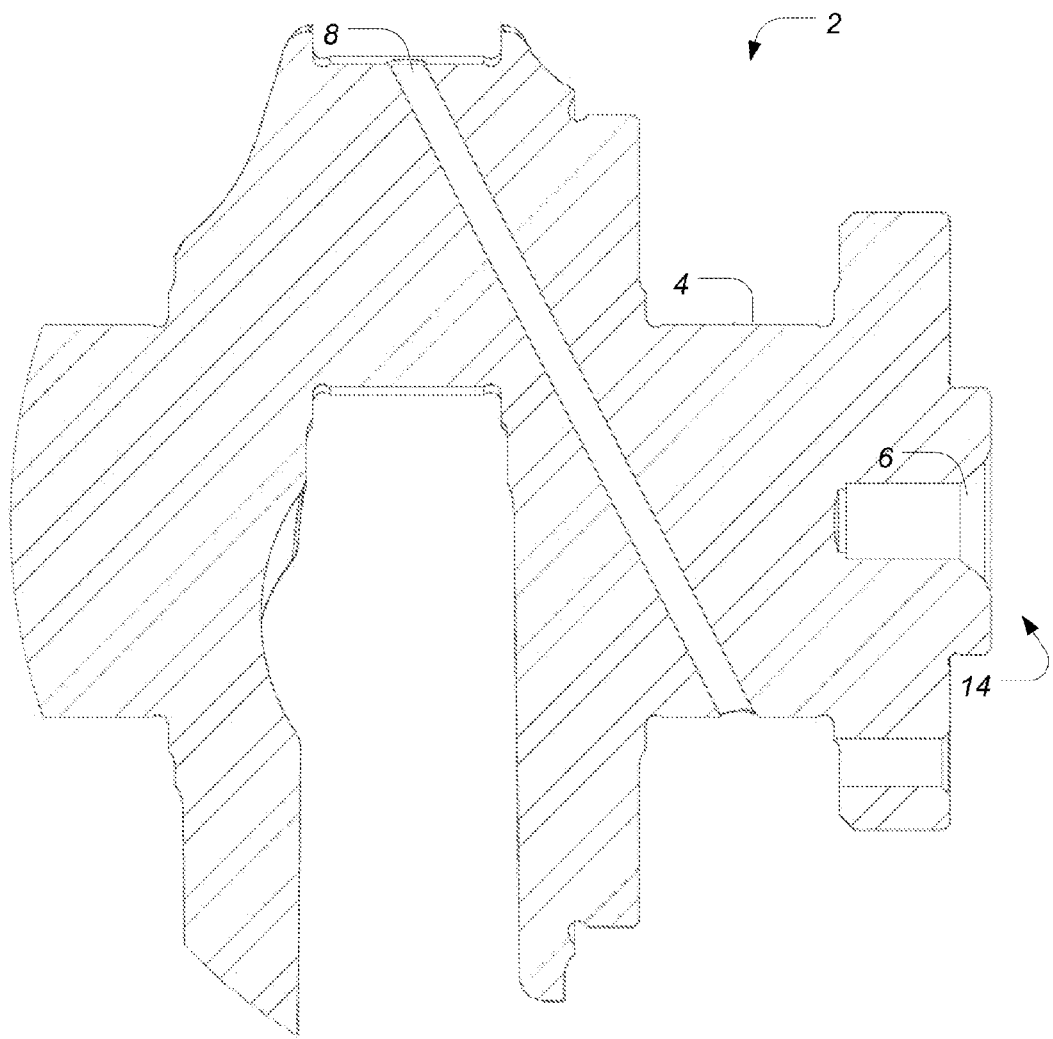
FIG. 2 illustrates one embodiment of a crankshaft rear bearing journal.

FIG. 2 illustrates one embodiment of the rear bearing journal 4. As can be seen in FIG. 2, the rear bearing journal 4 comprises a substantially solid piece. The rear bearing journal 4 is designed to counteract the rotation and torsional forces applied to the rear bearing journal 4 by the rotation of the crankshaft 2. In some embodiments, it may be advantageous to measure a torque output of an engine coupled to the crankshaft 2. In some embodiments, the output torque of the engine may be measured by measuring the torque applied to the rear bearing journal 4 of the crankshaft 2. However, the solid rear bearing journal 4 may not provide adequate space or stress characteristics for measuring the output torque of the engine.

Figure 3:
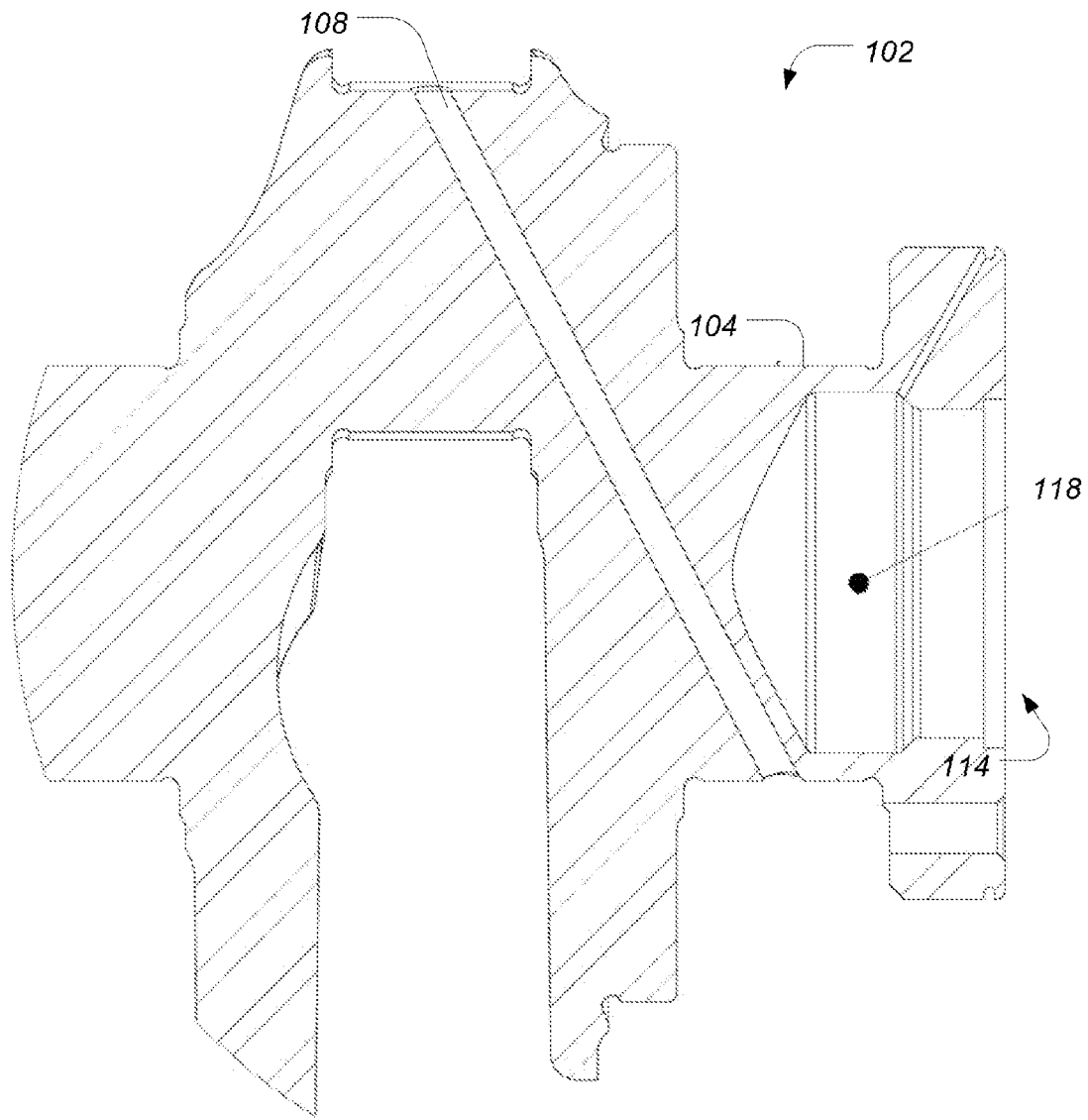
FIG. 3 illustrates one embodiment of a crankshaft rear bearing journal comprising a substantially cylindrical cavity.

FIG. 3 illustrates one embodiment of a rear bearing journal 104 configured to measure an output torque of an engine. The rear bearing journal 104 may comprise a cavity 118 in the output (aft) end 114 of the crankshaft 102. The cavity 118 may comprise a hollow section or a counter-bore formed in the rear bearing journal 104. The cavity 118 may be configured to generate sufficient torsional strain levels to allow torque measurements on both the inner diameter of the cavity 118 and the outer diameter of the rear bearing journal 104. The geometry of the cavity 118 may be selected to provide a predictable strain response under load. For example, in some embodiments, the cavity 118 may comprise a substantially cylindrical (or tubular) cavity. The cavity 118 may extend into the rear bearing journal 104 to a specific depth, as illustrated, or may extend through the rear bearing journal 104. The specific depth may be selected to prevent overly weakening the rear bearing journal 104 in the plane of bending loads resulting from the reciprocation of pistons attached to the crankshaft 102. In some embodiments, the depth of the cavity 118 may be selected such that the cavity 118 does not intersect the oil passage 108 extending through the rear-bearing journal. In other embodiments, the cavity 118 may intersect the oil passage 108.

In some embodiments, the size of the cavity 118 may be selected such that the cavity 118 generates a predictable strain under load in the rear bearing journal 104. The rear bearing journal 104 may experience a predictable and measurable strain or torque that is proportional to a torque output of an engine that is coupled to the crankshaft 102. In some embodiments, the depth and diameter of the cavity 118 may be selected to prevent overly weakening the rear bearing journal 104. For example, in some embodiments, the diameter and depth of the cavity 118 may be selected such that the rear bearing journal 104 experiences a strain of 10-15% of the elastic limit of the rear bearing journal material. As another example, in one embodiment, a rear bearing journal 104 comprising a substantially cylindrical cavity may experience a stress level of, for example, 9000 PSI as compared to the unmodified rear bearing journal 4 which may only experience a stress level of, for example, 4000 PSI under the same torque load. Those skilled in the art will recognize that the percentage strain of the elastic limit and the increase in PSI may be selected based on the material used, expected strain under load, geometry of the cavity 118, and/or other parameters. In some embodiments, the size of the cavity 118 may be selected to avoid interference with a bolt circle located on the output end 114 of the rear bearing journal 104. In some embodiments, the cavity 118 may be concentrically located within the rear bearing journal 104.

Figure 4:
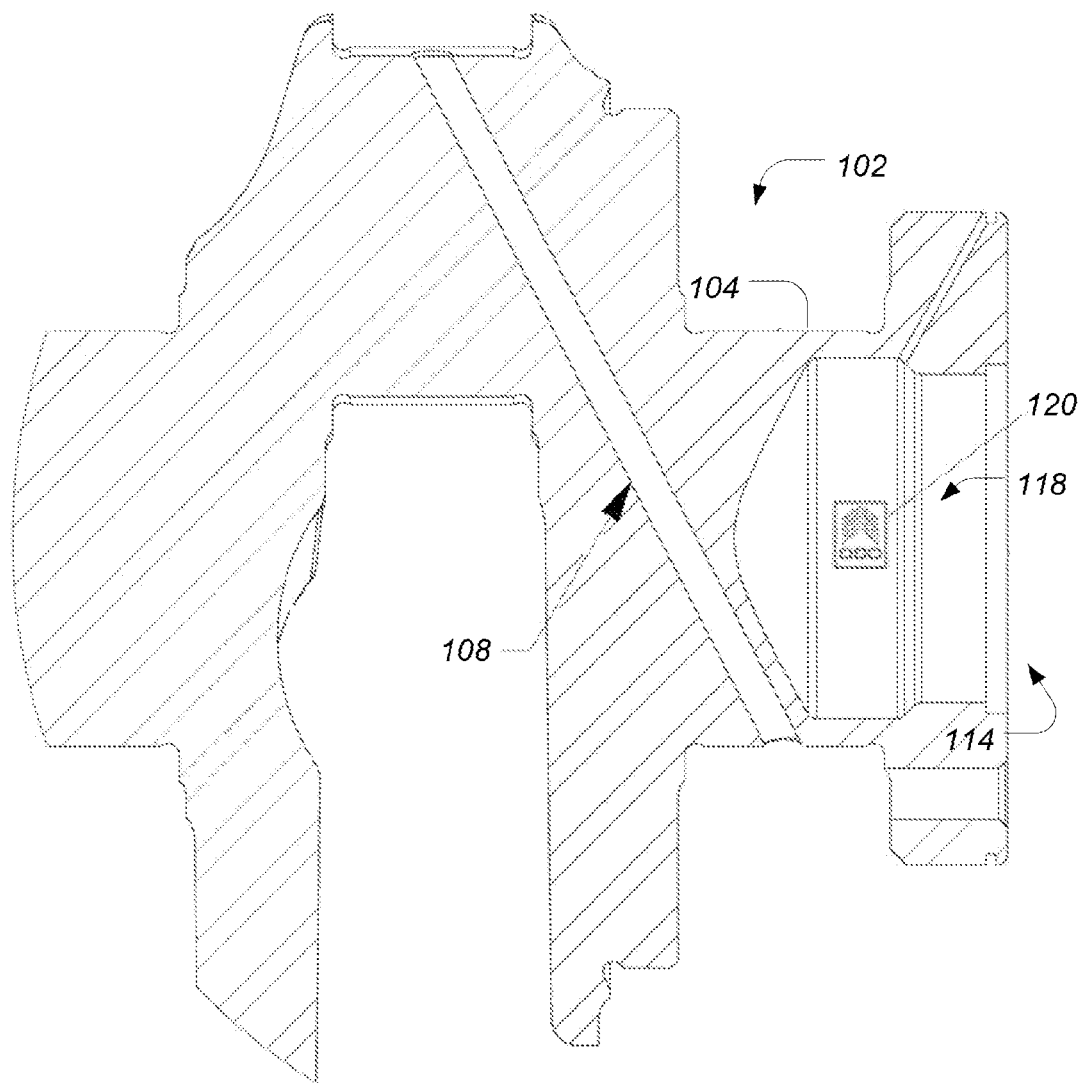
FIG. 4 illustrates one embodiment of the rear bearing journal of FIG. 3 comprising a torque sensor mounted to the rear bearing journal.

The torque exerted on the rear bearing journal 104 and the cavity 118 by the rotation of the crankshaft may be measured by one or more torque sensors coupled to the rear bearing journal 104. The one or more torque sensors may be coupled to the inner diameter of the cavity 118 and/or the outer diameter of the rear bearing journal 104. FIG. 4 illustrates one embodiment of the rear bearing journal 104 comprising a torque sensor 120 mounted on the inner diameter of the cavity 118. The torque sensor 120 may be configured to measure the strain experienced by the rear bearing journal 104 during operation of the crankshaft 102 by an attached engine. In some embodiments, the torque sensor 120 may be mounted on the outer diameter of the rear bearing journal 104 concentric with the cavity 118. The torque sensor 120 may comprise any suitable sensor for measuring the torque experienced by the rear bearing journal 104, such as, for example, a strain gage, a magnetoresistive torque sensor, or a magneto-elastic torque sensor to name just a few.

In some embodiments, the torque sensor 120 may comprise one or more strain gages. For example, a first strain gage and a second strain gage may be located on the inner diameter of the cavity 118 and configured to form a Wheatstone bridge. The first and second strain gages may comprise foil etched strain gages attached to the inner diameter of the cavity 118 by an adhesive or may be formed directly onto the rear bearing journal 104, such as, for example, through sputter (thin-film) processing or thick-film processing. Those skilled in the art will recognize that any suitable method may be employed for coupling the strain gages to the rear bearing journal 104.

In some embodiments, the rear bearing journal 104 may comprise a plurality of cavities 118 extending from the output end 114 of the rear bearing journal 104 into the rear bearing journal 104. For example, the rear bearing journal 104 may comprise a plurality of substantially circular cavities. In some embodiments, one or more of the cavities may have one or more torque sensors 120 located on the inner diameter of the cavities. In some embodiments, one or more torque sensors 120 may be located on the outer diameter of the rear bearing journal 104. The one or more torque sensors 120 may be located concentrically with the plurality of cavities.

Figure 5:
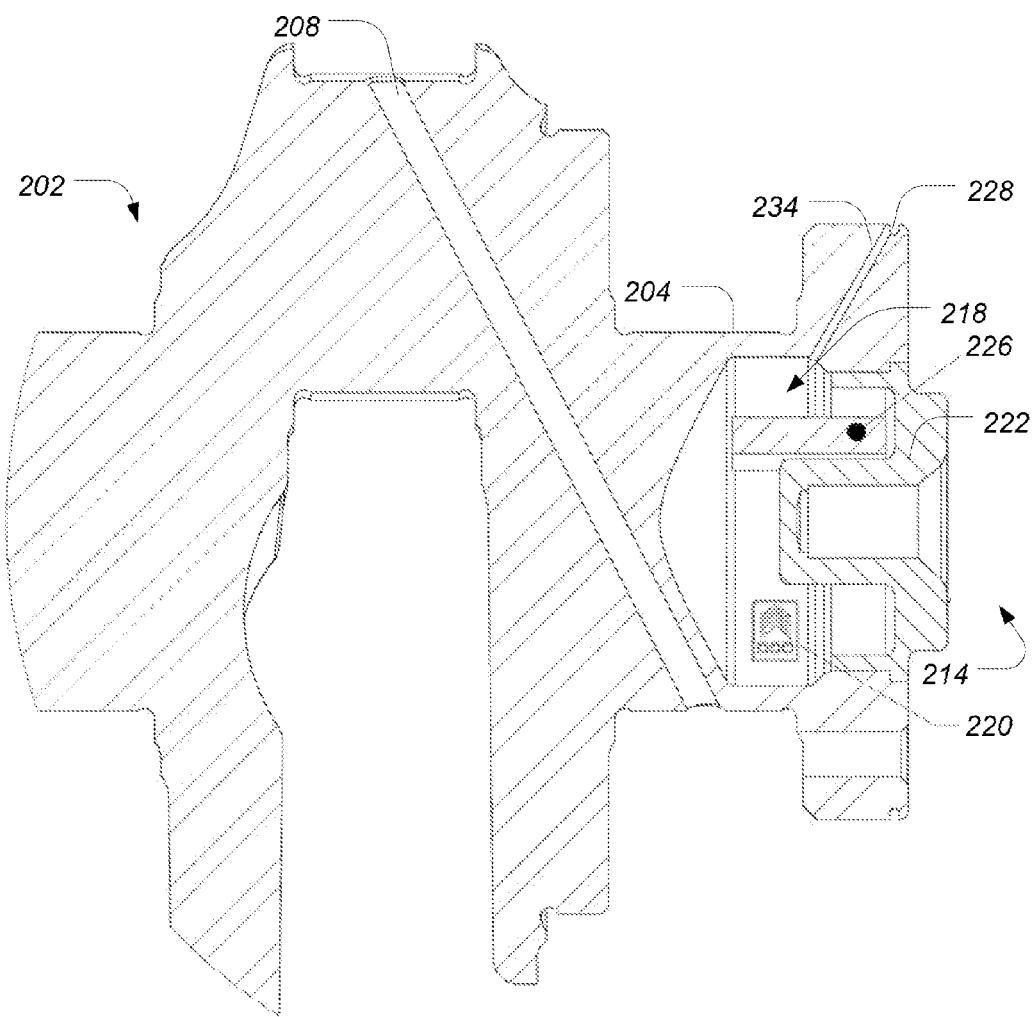
FIG. 5 illustrates one embodiment of the rear bearing journal of FIG. 3 comprising a plug located in the substantially cylindrical cavity.

In some embodiments, the presence of the cavity 118 may result in the removal of existing piloting features of the rear bearing journal 104. For example, in one embodiment, a cavity 118 may prevent a mounting plate, such as mounting plate 6, from being coupled to the rear bearing journal 104. In some embodiments, a plug may be located in the substantially cylindrical cavity 118 to provide required output end geometry for piloting of an attached transmission component, such as, for example, a flywheel. FIG. 5 illustrates one embodiment of rear bearing journal 204 comprising a plug 222 located in the cavity 218. The plug 222 may be configured to couple a transmission component to the rear bearing journal 204. The plug 222 may comprise a bolt circle configured to receive a plurality of bolts for mounting a transmission component to the rear bearing journal 204. In some embodiments, the plug 222 may comprise a mounting plate similar to mounting plate 6. The plug 222 may provide piloting of the attached transmission component. The plug 222 may be configured to seal the substantially cylindrical cavity 218 when the plug is located within the cavity 218. A portion of the plug 222 may extend beyond the output end of the rear bearing journal 204 to provide clearance for the coupled transmission component. The plug 222 may be coupled to the inner diameter of the cavity 218 by any suitable attachment mechanism, such as, for example, press fitting, welding, adhesive attachment to name just a few.

In some embodiments, a torque sensor 220 may be coupled to the rear bearing journal 204, such as, for example, on the inner diameter of the cavity 218. The torque sensor 220 may be coupled to one or more circuit components 226 for conditioning and transmission of the torque measurements obtained by the torque sensor 220. The one or more circuit components 226 may comprise, for example, a signal conditioning circuit and a telemetry circuit. In some embodiments, the one or more circuit components 226 may be in signal communication with a transmitter 228, such as, for example, an inductive coil or annular conductor mounted on the rear bearing journal 204. The transmitter 228 may be coupled to the torque sensor 220 and/or the one or more circuit components 226 through a wired and/or wireless connection. For example, the transmitter 228 may be in signal communication with the one or more circuit components 226 through a wired connection passing through a counter-bore 234 formed in the bearing journal 204. In one embodiment, the transmitter 228 may rotate as the rear bearing journal 204 rotates. The transmitter 228 may be in signal communication with a receiver mounted on the engine block. The transmitter 228 may transmit the torque measurements using analog and/or digital signal communication. In some embodiments, the receiver mounted on the engine block may comprise a stationary stator located concentric with the transmitter 228. The transmitter 228 may transmit torque measurements generated by the torque sensor 220 to the receiver. In some embodiments, the transmitter 228 may comprise a transceiver configured to receive power, for example, from a stationary stator mounted on the engine block through, for example, wireless power transfer. The transceiver may be configured to power the one or more circuit components 226 and/or the torque sensor 220 through wireless power transfer from the stationary stator. In some embodiments, a power supply may be electrically coupled to the one or more circuit components 226 and may be located, for example, in the cavity 218 or on the one or more transmission components.

Figure 6:
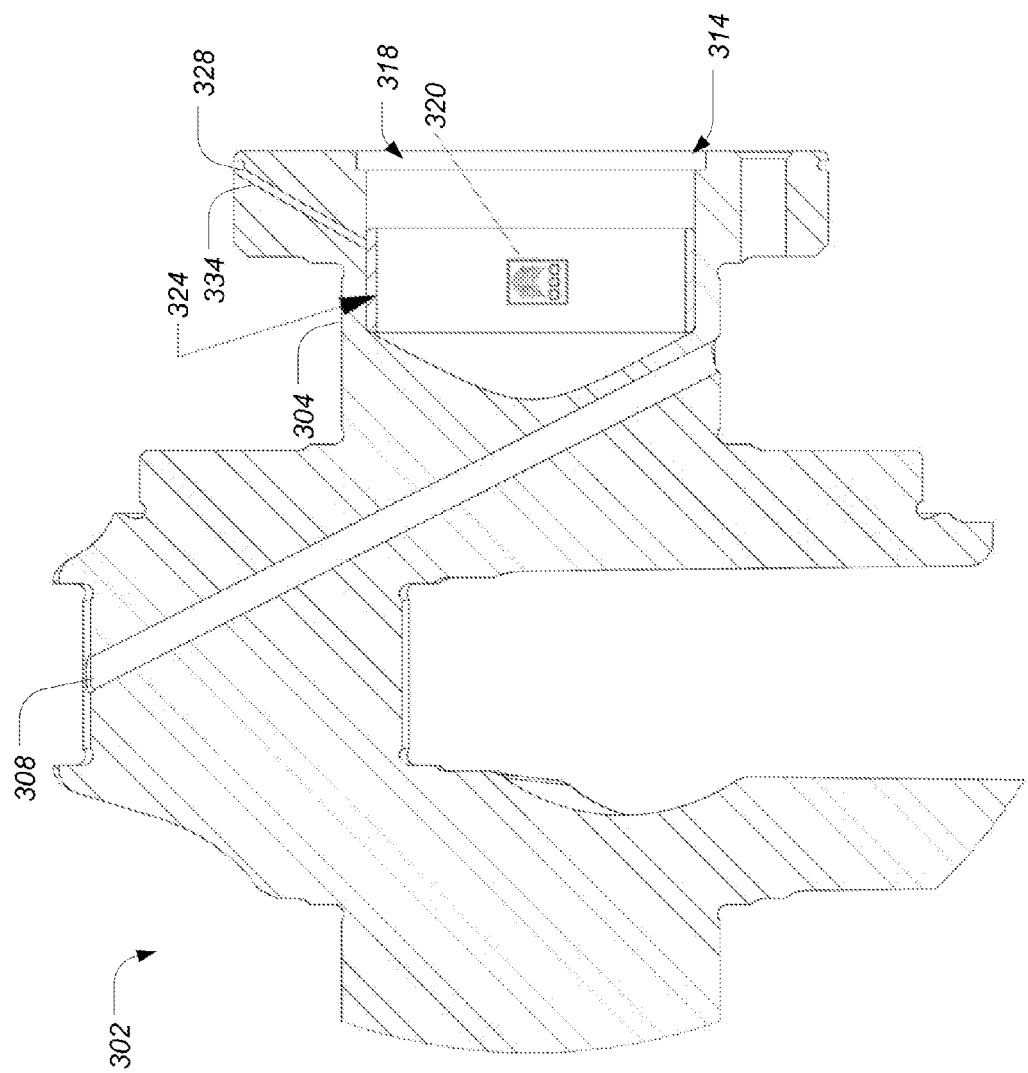
FIG. 6 illustrates one embodiment of the rear bearing journal of FIG. 3 comprising a sleeve located in the substantially cylindrical cavity.

FIG. 6 illustrates one embodiment of a rear bearing journal 304. The rear bearing journal 304 comprises a substantially cylindrical cavity 318 extending from the output end 314 of the crankshaft 302 forward into the rear bearing journal 304. A sleeve 324 is located within the cavity 318. The sleeve 324 may support at least one torque sensor 320 mounted thereon. One or more torque sensors 320 may be located on the inner surface of the sleeve 324 and/or the outer surface of the sleeve 324. In some embodiments, the sleeve 324 may comprise a material configured for torque sensing, such as, for example, a magneto-restrictive or magneto-elastic material. In some embodiments, the cross section of the sleeve 324 is selected so as to be compliant with the size of the cavity 318 and may be selected such that the sleeve 324 offers little to no torsional resistance to the twisting experienced by the rear bearing journal 304 during operation. For example, the sleeve 324 may comprise a substantially circular or tubular cross-section when the cavity 318 comprises a substantially cylindrical cavity. In some embodiments, one or more circuit components, such as, for example, a signal conditioning circuit and a telemetry circuit, may be mounted on the sleeve 324. The sleeve 324 may be located within the cavity 318 through any suitable means, such as, for example, press fitting, welding, adhesive, or ay other means for mounting the sleeve 324. In some embodiments, the sleeve may be placed over the outer diameter of the rear bearing journal 304. In some embodiments, the one or more torque sensors 320 may be in signal communication with a transmitter 328. The transmitter may be located, for example, on the outer diameter of the rear bearing journal 304. As another example, the transmitter 328 may be located on one or more transmission components coupled to the output end 314 of the crankshaft 302. In some embodiments, the transmitter 328 may be in signal communication with the torque sensor 320, for example, through a wire extending through a drilled hole 334 connecting the cavity 318 to the outer diameter of the mounting plate 314.

Figure 7:
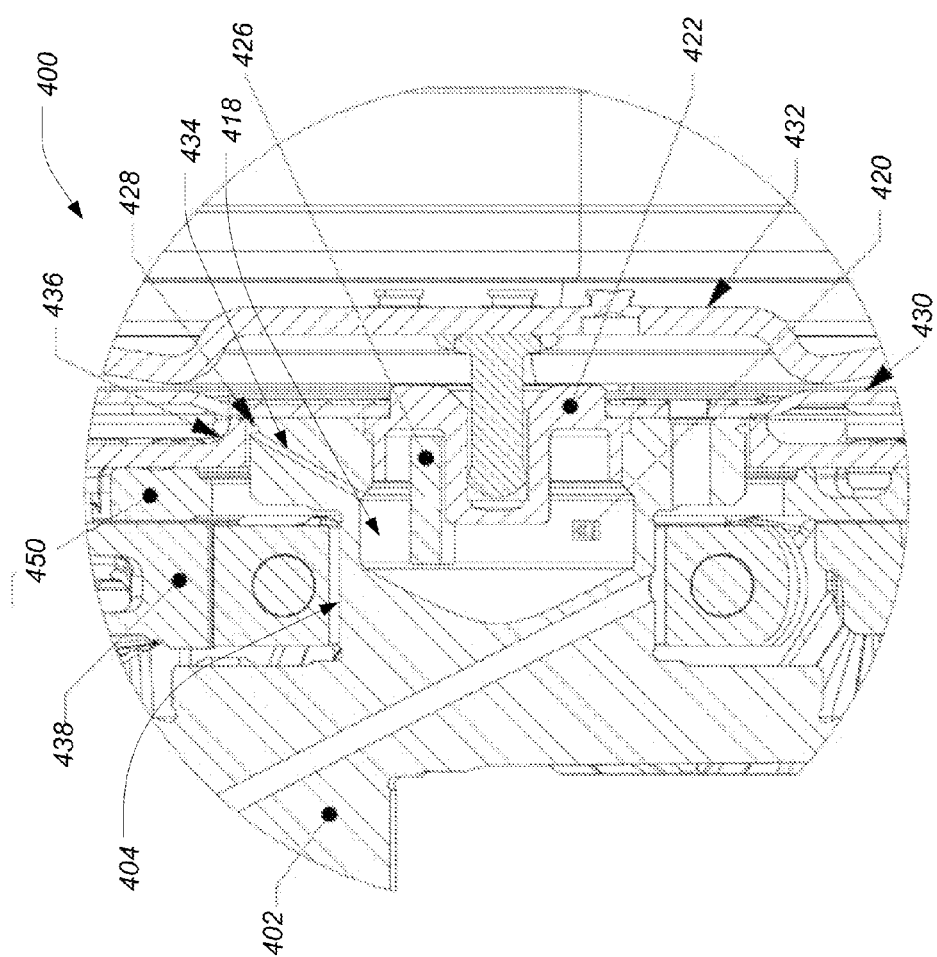
FIG. 7 illustrates one embodiment of an engine comprising a crankshaft configured for measuring torque generated by a substantially cylindrical cavity in the rear bearing journal.

FIG. 7 illustrates one embodiment of a cross section of an engine 400 comprising a torque measuring crankshaft 402. The torque measuring crankshaft 402 may comprise a cavity 418 extending from the output end 414 into the rear bearing journal 404. The cavity 418 may comprise, for example, a substantially cylindrical cavity. A torque sensor 420 may be configured to measure the strain experienced by the rear bearing journal 404. The torque sensor 420 may be mounted on the inner diameter of the cavity 418 and/or may be mounted on the outer diameter of the rear bearing journal 404. A plug 422 may be located in the cavity 418 and may comprise a geometry configured to provide piloting of one or more attached transmission components, such as, for example, a flex plate 430, a torque convertor 432, or a flywheel. One or more circuit components 426, such as a signal conditioning circuit or a telemetry circuit, may be mounted on the plug 422. The one or more circuit components 426 may be in signal communication with the torque sensor 420. The one or more circuit components 426 may be in signal communication with a transmitter, such as, for example, the annular conductor 428. For example, the one or more circuit components 426 may be coupled to the annular conductor 428 by a wire running through a counter-bore 434 in the rear bearing journal 404. The counter-bore 434 may be located outside of and/or aft of the rear main seal 450 of the rear bearing journal 404. The annular conductor 428 may be in signal communication with a receiver, such as, for example, a stationary stator 436, mounted on the engine block 438. The annular conductor 428 may transfer data indicative of the torque measurements obtained by the torque sensor 420 to the stationary stator 436. The annular conductor 428 may be configured to receive power from the stationary stator 436 through wireless power transfer.

In some embodiments, the one or more circuit components 426 may be located on one or more transmission components coupled to the rear bearing journal 404. For example, the signal conditioning circuit and/or the telemetry circuit may be located on a transmission component, such as, for example, the flex plate 430, the torque convertor 432, or the flywheel. In some embodiments, the one or more circuit components 426 located on the one or more transmission components may be coupled to the torque sensor 420, for example, by one or more wires. A wired connection between the torque sensor 420 and the one or more circuit components 426 located on the one or more transmission components is possible since the one or more transmission components rotate in unison with the crankshaft 402.

Figure 8A:
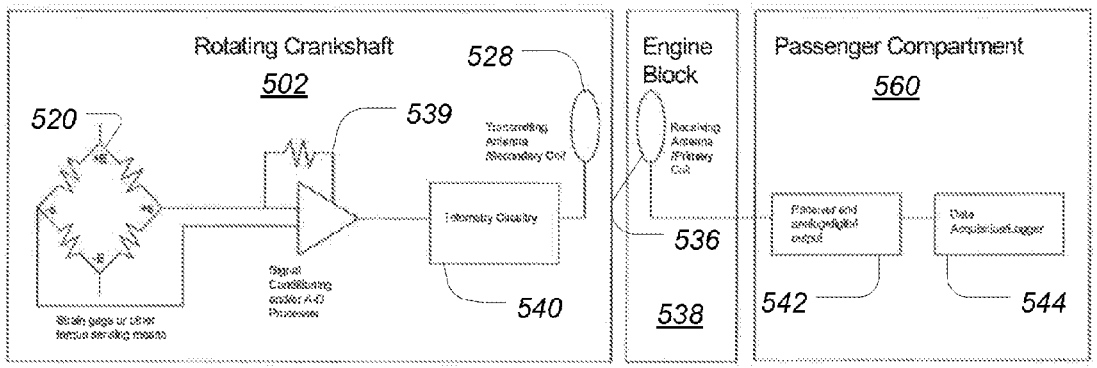
FIGS. 8A-8C illustrate various embodiments of mounting locations for one or more circuit elements.
Figure 8B:
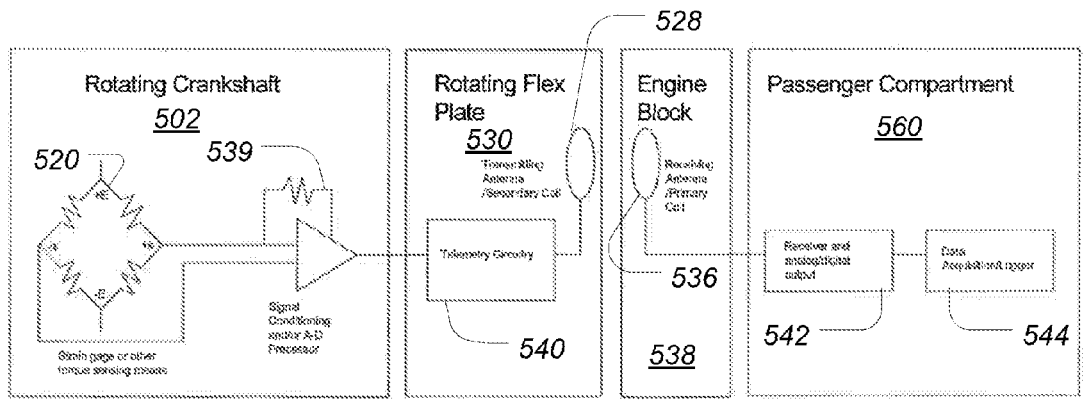
Figure 8C:
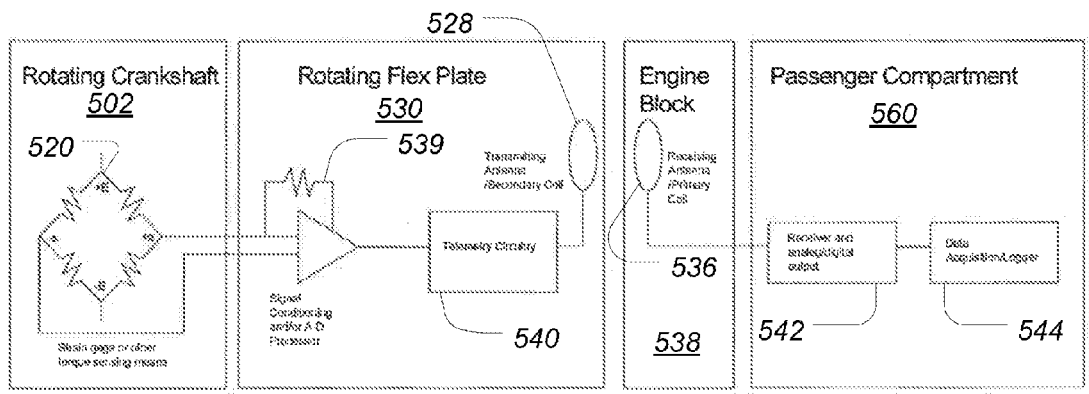

FIGS. 8A-8C illustrate various embodiments of locations for one or more components of a torque measuring crankshaft. For example, in FIG. 8A, a torque sensor 520, a signal conditioning circuit 539, and a telemetry circuit 540 are located on a rotating crankshaft 502, such as, for example, in a substantially cylindrical cavity formed in the output end of a rear bearing journal. The torque sensor 520 may comprise, for example, four strain gages. The four strain gages may be located on the inner diameter of a cavity formed in the rear bearing journal of the rotating crankshaft 502 and/or may be located on the outer diameter of the rear bearing journal. The torque sensor 520 may be electrically coupled to the signal conditioning circuit 539, which may be electrically coupled to the telemetry circuit 540. The telemetry circuit 540 may be coupled to a transmitter, such as, for example, an annular conductor 528. The annular conductor 528 may be mounted on the rotating crankshaft 502. The annular conductor 528 may be in signal communication with a receiver, such as a stationary stator 536 located on the engine block 538. The annular conductor 528 may provide data to the stationary stator 536 and may receive power from the stationary stator 536. The stationary stator 536 may be in signal communication with a receiver 542 and a data acquisition device 544 located in the passenger compartment 560 of a vehicle. The stationary stator 536 may communicate with the receiver 542 through a wired and/or a wireless connection.

In the embodiment illustrated in FIG. 8B, the torque sensor 520 and the signal conditioning circuit 539 are mounted on the rotating crankshaft 502 and the telemetry circuit 540 is mounted on a rotating flex plate 530. The telemetry circuit 540 may be electrically coupled to the signal conditioning circuit 539 through a wired and/or wireless connection. Similar to the embodiment of FIG. 8A, the telemetry circuit 540 may be electrically coupled to an annular conductor 528. The annular conductor 538 may provide signal communication to a stationary stator 536 located on the engine block 540 and may receive power from the stationary stator 536. The annular conductor 528 may be located, for example, with the telemetry circuit 540 on the rotating flex plate 530. In the embodiment shown in FIG. 8C, the signal conditioning circuit 539 and the telemetry circuit 540 are located on the rotating flex plate 530. The signal conditioning circuit 539 and the telemetry circuit 540 are electrically coupled to the torque sensor 520, for example, through a wired connection. The annular conductor 528 provides signal communication to and power transfer from a stationary stator 536 located on the engine block 538.

In various embodiments, a crankshaft, such as the crankshaft 402, may be used to measure the output torque of an engine. A crankshaft 402 having a rear bearing journal 404 comprising a substantially cylindrical cavity 418 may be installed into an engine 400. A torque sensor 420 may operatively coupled to the substantially cylindrical cavity 418. The torque sensor 420 may be coupled to the inner diameter of the cavity 418 or the outer diameter of the rear bearing journal 404. The torque sensor 420 may comprise, for example, a plurality of strain gages. The engine 400 may be operated to generate torque and rotate the crankshaft 402. The torque generated by the engine 400 may cause strain on the rear bearing journal 404 due to the presence of the substantially cylindrical cavity 418. The strain experienced by the rear bearing journal 404 may be measured by the torque sensor 420. The strain exerted on the rear bearing journal 404 and the cavity 418 may be proportional to the output torque of the engine 400. The measured torque may be transmitted to a remote location through one or more circuit components 426. The one or more circuit components 426 may comprise a signal conditioning circuit and a telemetry circuit for preparing the torque measurement for transmission. The one or more circuit components 426 may be electrically coupled to an annular conductor 428. The annular conductor 428 may provide signal transmission to a stationary stator 436 mounted, for example, on the engine block 438 and may receive power through wireless power transfer from the stationary stator 436. The one or more circuit components 426 and the annular conductor 428 may transmit the measured torque from the torque sensor 420 to the stationary stator 436. The stationary stator 436 may be in signal communication with one or more data acquisition devices for determining output torque of the engine 400 based on the measured torque.

In various embodiments, an engine crankshaft is disclosed. The engine crankshaft comprises a rear bearing journal and at least one torque sensor. The rear bearing journal may comprise an output end. The rear bearing journal may define a substantially cylindrical cavity extending from the output end into the rear bearing journal. The at least one torque sensor may be operatively coupled to the rear bearing journal. The at least one torque sensor may be configured to generate a torque signal corresponding to a torque exerted on the rear bearing journal. The torque exerted on the rear bearing journal may be indicative of a torque output of an engine.

In some embodiments, the at least one torque sensor comprises a strain gage. The at least one torque sensor may be operatively coupled to an outer diameter of the rear bearing journal or an inner diameter of the cylindrical cavity. A sleeve may be located within the cavity. The sleeve may comprise an outer diameter approximately equal to the inner diameter of the substantially cylindrical cavity. The at least one torque sensor may be mounted to the sleeve.

In some embodiments, the rear bearing journal comprises an oil passage. The substantially cylindrical cavity may comprise a depth that does not intersect the oil passage. In other embodiments, the substantially cylindrical cavity may comprise a depth that intersects the oil passage.

In some embodiments, the engine crankshaft may comprise a signal conditioning circuit in signal communication with at least one torque sensor and a telemetry circuit in signal communication with the signal conditioning circuit. The telemetry circuit may be in signal communication with a remote receiver. The signal conditioning circuit and/or the telemetry circuit may be mounted in the cavity.

In some embodiments, the engine crankshaft may comprise a plug configured to provide piloting of a transmission component. The transmission component may be coupled to the rear bearing journal. The conditioning circuit and the telemetry circuit may be mounted on the transmission component. The transmission component may be selected from the group consisting of: a flywheel, a torque converter, and a clutch.

In some embodiments, the engine crankshaft may comprise an annular conductor operatively coupled to the at least one torque sensor. The annular conductor may be in signal communication with a stator mounted to an engine block. The stator may provide power to the annular conductor. The annular conductor may provide the torque signal to the stator.

In some embodiments, an internal combustion engine is disclosed. The internal combustion engine may comprise an engine block, a plurality of pistons reciprocally movable within the engine block, and a crankshaft operably coupled to the plurality of pistons. The crankshaft may comprise a rear bearing journal. The rear bearing journal may comprise an output end. The rear bearing journal defines a substantially cylindrical cavity extending from the output end into the rear bearing journal. At least one torque sensor may be operatively coupled to the rear bearing journal. The at least one torque sensor may be configured to generate a torque signal corresponding to a torque exerted on the rear bearing journal by the engine. The at least one torque sensor may comprise a strain gage. The at least one torque sensor may be operatively coupled to an outer diameter of the rear bearing journal or an inner diameter of the substantially cylindrical cavity.

In some embodiments, a sleeve may be located within the substantially cylindrical cavity. The sleeve may comprise an outer diameter equal to the inner diameter of the substantially cylindrical cavity. The at least one torque sensor may be mounted to the sleeve. In some embodiments, the internal combustion engine may comprise a transmission component coupled to the rear bearing journal and a plug configured to provide piloting of the transmission component. The plug may be located within the substantially cylindrical cavity.

In some embodiments, the internal combustion engine may comprise a signal conditioning circuit in signal communication with the at least one torque sensor, a telemetry circuit in signal communication with the signal conditioning circuit, a stator fixedly coupled to the engine block, and an annular conductor in signal communication with the telemetry circuit. The annular conductor may be in signal communication with the stator. The stator may provide power to the annular conductor and the annular conductor may provide the torque signal to the stator.

In various embodiments, a method for measuring torque output of an engine is disclosed. The method may comprise installing a torque sensing crankshaft into the engine, operating the engine to generate torque and obtaining the torque signal from the torque sensing crankshaft. The torque sensing crankshaft may comprise a rear bearing journal. The rear bearing journal may comprise an output end. The rear bearing journal may define a substantially cylindrical cavity extending from the output end into the rear bearing journal. At least one torque sensor may be operatively coupled to the rear bearing journal. The at least one torque sensor may be configured to generate a torque signal corresponding to a torque exerted on the rear bearing journal by the engine.

While various details have been set forth in the foregoing description, it will be appreciated that the various aspects systems and methods for an engine crankshaft torque sensor may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

A sale of a system or method may occur in a territory even if components of the system or method are located and/or used outside the territory. Further, implementation of at least part of a system for performing a method in one territory does not preclude use of the system in another territory.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. An engine crankshaft comprising:
   an output end comprising a rear bearing journal, wherein the rear bearing journal defines a substantially cylindrical cavity having a specific depth within the crankshaft extending from the output end into the rear bearing journal, wherein the cavity defines an inner diameter surface, and wherein the specific depth of the cylindrical cavity is selected to prevent weakening the rear bearing journal in the plane of a bending load; and
   at least one torque sensor operatively coupled to the inner diameter surface of the cavity defined by the rear bearing journal of the crankshaft, wherein the at least one torque sensor is configured to generate a torque signal corresponding to a torque exerted on cylindrical cavity within the rear bearing journal, and wherein the torque exerted on the cylindrical cavity is indicative of a torque output of an engine.

2. The engine crankshaft of claim 1, wherein the at least one torque sensor comprises a strain gage.

3. The engine crankshaft of claim 1, wherein the at least one torque sensor is operatively coupled to an outer diameter of the rear bearing journal.

4. The engine crankshaft of claim 1, wherein the at least one torque sensor is operatively coupled to an inner diameter of the substantially cylindrical cavity.

5. The engine crankshaft of claim 4, comprising:
   a sleeve located within the substantially cylindrical cavity, wherein the sleeve comprises an outer diameter substantially equal to the inner diameter of the substantially cylindrical cavity, wherein the at least one torque sensor is mounted to the sleeve.

6. The engine crankshaft of claim 1, wherein the rear bearing journal comprises an oil passage.

7. The engine crankshaft of claim 6, wherein the substantially cylindrical cavity comprises a depth that does not intersect the oil passage.

8. The engine crankshaft of claim 6, wherein the substantially cylindrical cavity comprises a depth that intersects the oil passage.

9. The engine crankshaft of claim 1, comprising:
   a signal conditioning circuit in signal communication with the at least one torque sensor; and
   a telemetry circuit in signal communication with the signal conditioning circuit, wherein the telemetry circuit is in signal communication with a remote receiver.

10. The engine crankshaft of claim 9, wherein the signal conditioning circuit is mounted in the substantially cylindrical cavity.

11. The engine crankshaft of claim 9, wherein the telemetry circuit is mounted in the substantially cylindrical cavity.

12. The engine crankshaft of claim 9, comprising:
    a plug configured to provide piloting of a transmission component mounted to the output end of the crankshaft, wherein the plug is located at least partially within the substantially cylindrical cavity.

13. The engine crankshaft of claim 12, wherein the conditioning circuit and the telemetry circuit are mounted on the transmission component.

14. The engine crankshaft of claim 13, wherein the transmission component is selected from the group consisting of: a flywheel, a torque converter, and a clutch.

15. The engine crankshaft of claim 1, comprising:
    an annular conductor operatively coupled to the at least one torque sensor, wherein the annular conductor is in signal communication with a stator mounted to an engine block, wherein the stator provides power to the annular conductor, and wherein the annular conductor provides the torque signal to the stator.

16. An internal combustion engine comprising:
    an engine block;
    a plurality of pistons reciprocally located within the engine block; and
    a crankshaft operably coupled to the plurality of pistons, the crankshaft comprising:
      an output end comprising a rear bearing journal, wherein the rear bearing journal defines a substantially cylindrical cavity having a specific depth within the crankshaft extending from the output end into the rear bearing journal, wherein the substantially cylindrical cavity comprises an inner diameter, wherein the specific depth of the cylindrical cavity is selected to prevent weakening the rear bearing journal in the plane of a bending load, and wherein the cavity defines an inner diameter surface; and
      at least one torque sensor operatively coupled to the inner diameter surface of the cavity defined by the rear bearing journal of the crankshaft, wherein the at least one torque sensor is configured to generate a torque signal corresponding to a torque exerted on the rear bearing journal by the engine, and wherein the torque exerted on the substantially cylindrical cavity is indicative of a torque output of an engine.

17. The internal combustion engine of claim 16, wherein the at least one torque sensor comprises a strain gage.

18. The internal combustion engine of claim 16, wherein the at least one torque sensor is operatively coupled to an outer diameter of the rear bearing journal.

19. The internal combustion engine of claim 16, wherein the at least one torque sensor is operatively coupled to the inner diameter of the substantially cylindrical cavity.

20. The internal combustion engine of claim 16, comprising:
 a sleeve located within the substantially cylindrical cavity, wherein the sleeve comprises an outer diameter equal to the inner diameter of the substantially cylindrical cavity, wherein the at least one torque sensor is mounted to the sleeve.

21. The internal combustion engine of claim 16, comprising:
 a transmission component coupled to the rear bearing journal; and
 a plug configured to provide piloting of the transmission component, wherein the plug is located at least partially within the substantially cylindrical cavity.

22. The internal combustion engine of claim 16, comprising:
 a signal conditioning circuit in signal communication with the at least one torque sensor;
 a telemetry circuit in signal communication with the signal conditioning circuit,
 an annular conductor in signal communication with the telemetry circuit, wherein the annular conductor is configured to rotate in unison with the crankshaft; and
 a stator fixedly coupled to the engine block, wherein the stator is in signal communication with the annular conductor, wherein the stator provides power to the annular conductor, and wherein the annular conductor provides the torque signal to the stator.

23. A method for measuring torque output of an engine, the method comprising:
 installing a torque sensing crankshaft into the engine, wherein the torque sensing crankshaft comprises:
  an output end comprising a rear bearing journal, wherein the rear bearing journal defines a substantially cylindrical cavity having a specific depth within the crankshaft extending from the output end into the rear bearing journal, wherein the cavity defines an inner diameter surface, and wherein the specific depth of the cylindrical cavity is selected to prevent weakening the rear bearing journal in the plane of a bending load; and
  at least one torque sensor operatively coupled to the inner diameter surface of the cavity defined by the rear bearing journal of the crankshaft, wherein the at least one torque sensor is configured to generate a torque signal corresponding to a torque output of the engine;
 operating the engine to generate torque on the torque sensing crankshaft; and
 obtaining the torque signal from the torque sensor.

\* \* \* \* \*